Figure 15:
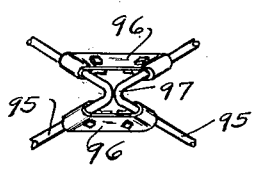

May 8, 1934.  B. F. FITCH  1,957,451
LIFTING CRADLE FOR DEMOUNTABLE AUTOMOBILE BODIES
Filed Nov. 13, 1931  5 Sheets-Sheet 1
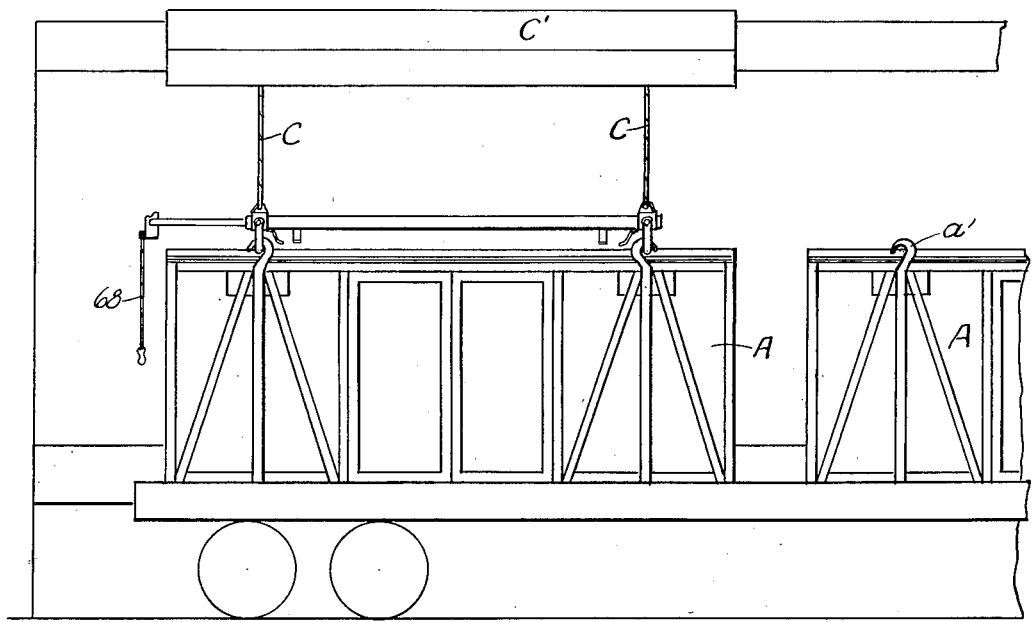
FIG. 1
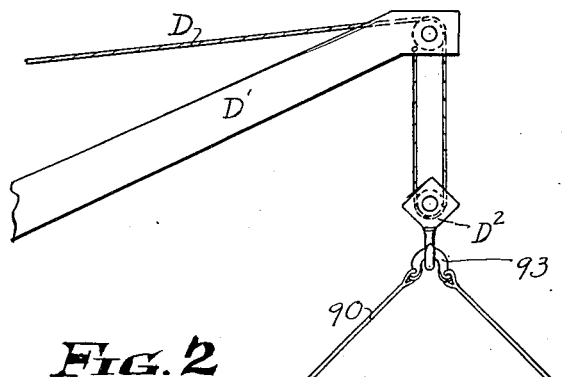
FIG. 2
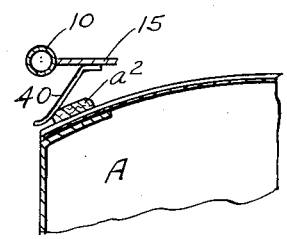
FIG. 3
Inventor
Benjamin F. Fitch
By Bates, Golrick & Fean
Attorneys
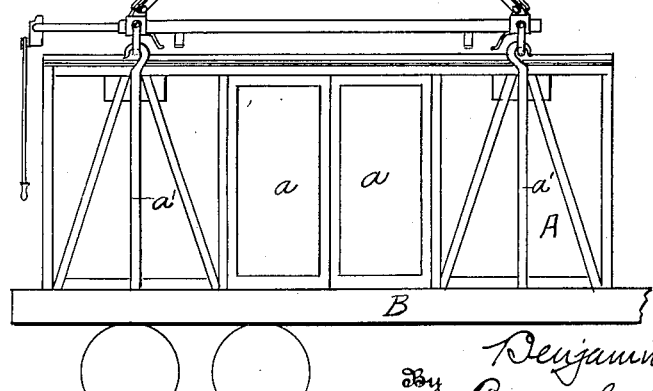

May 8, 1934.  B. F. FITCH  1,957,451
LIFTING CRADLE FOR DEMOUNTABLE AUTOMOBILE BODIES
Filed Nov. 13, 1931  5 Sheets-Sheet 2
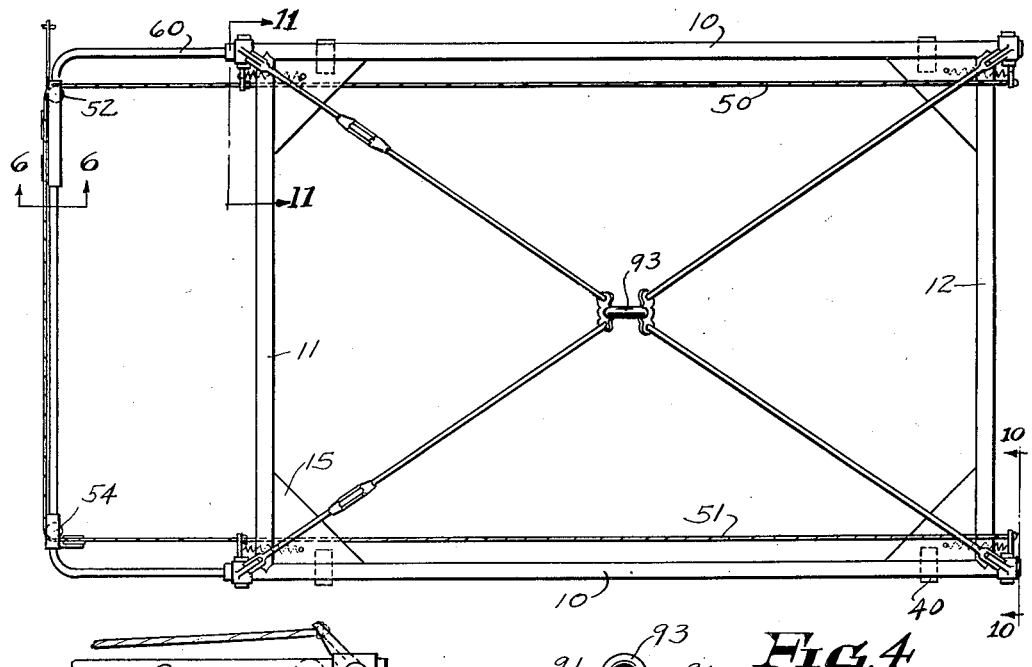
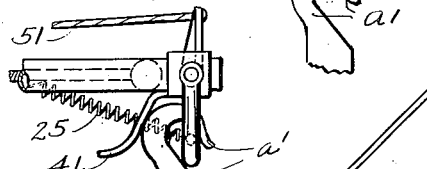
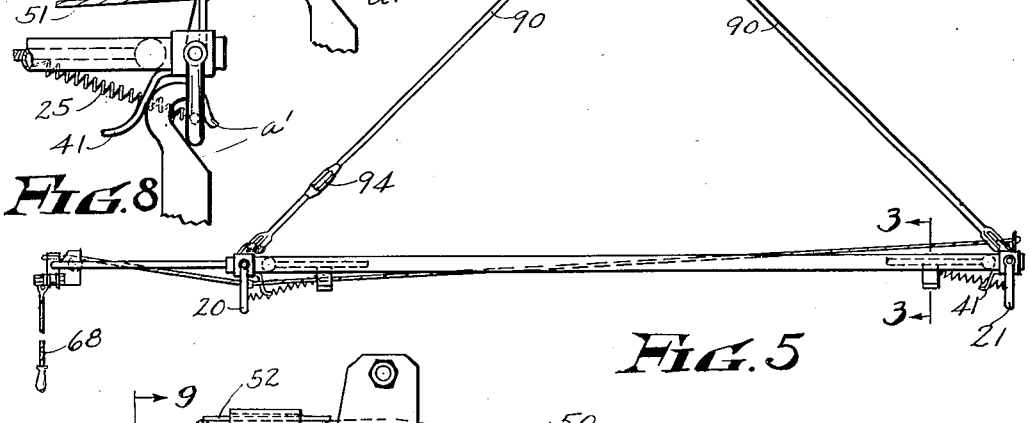
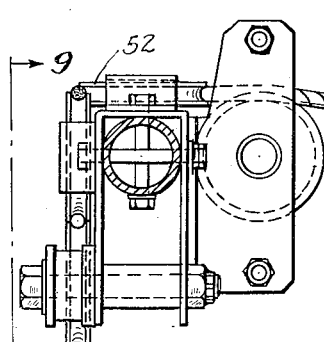
Inventor
Benjamin F. Fitch,
By Baker, Golrick & Tears
Attorneys May 8, 1934. B. F. FITCH 1,957,451
LIFTING CRADLE FOR DEMOUNTABLE AUTOMOBILE BODIES
Filed Nov. 13, 1931 5 Sheets-Sheet 3
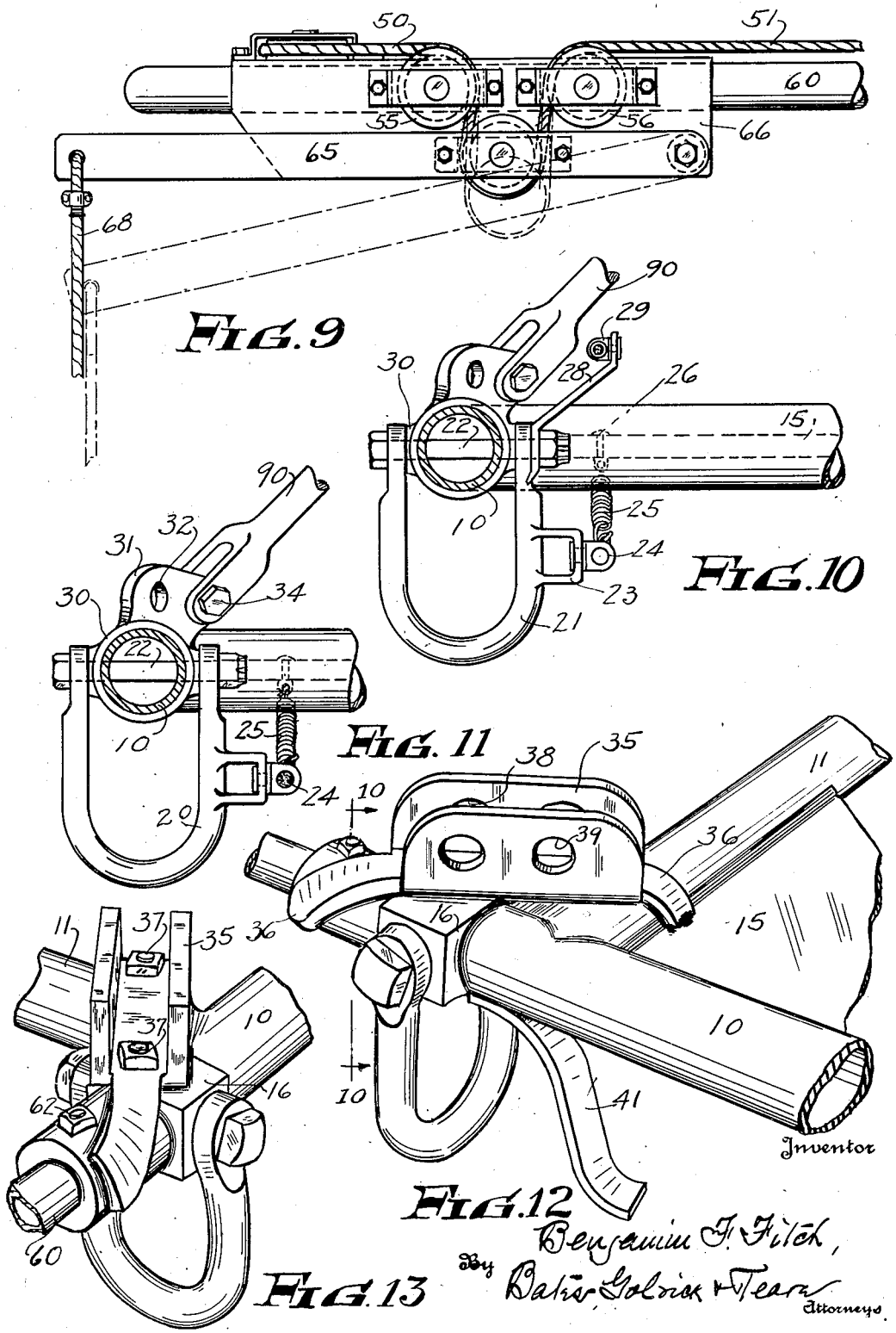

May 8, 1934.  B. F. FITCH  1,957,451

LIFTING CRADLE FOR DEMOUNTABLE AUTOMOBILE BODIES

Filed Nov. 13, 1931  5 Sheets-Sheet 4

Inventor
Benjamin F. Fitch,
By Baker, Golrick & Tear
Attorneys

May 8, 1934.  B. F. FITCH  1,957,451
LIFTING CRADLE FOR DEMOUNTABLE AUTOMOBILE BODIES
Filed Nov. 13, 1931  5 Sheets-Sheet 5
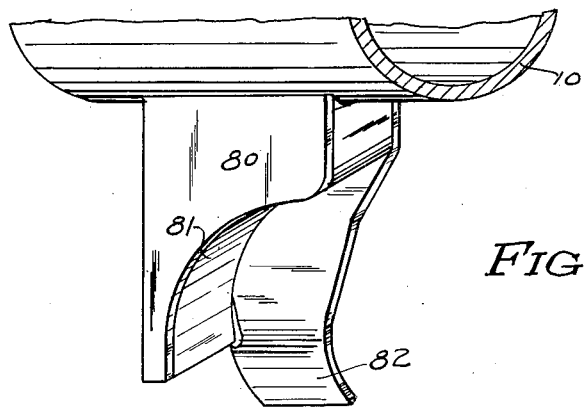
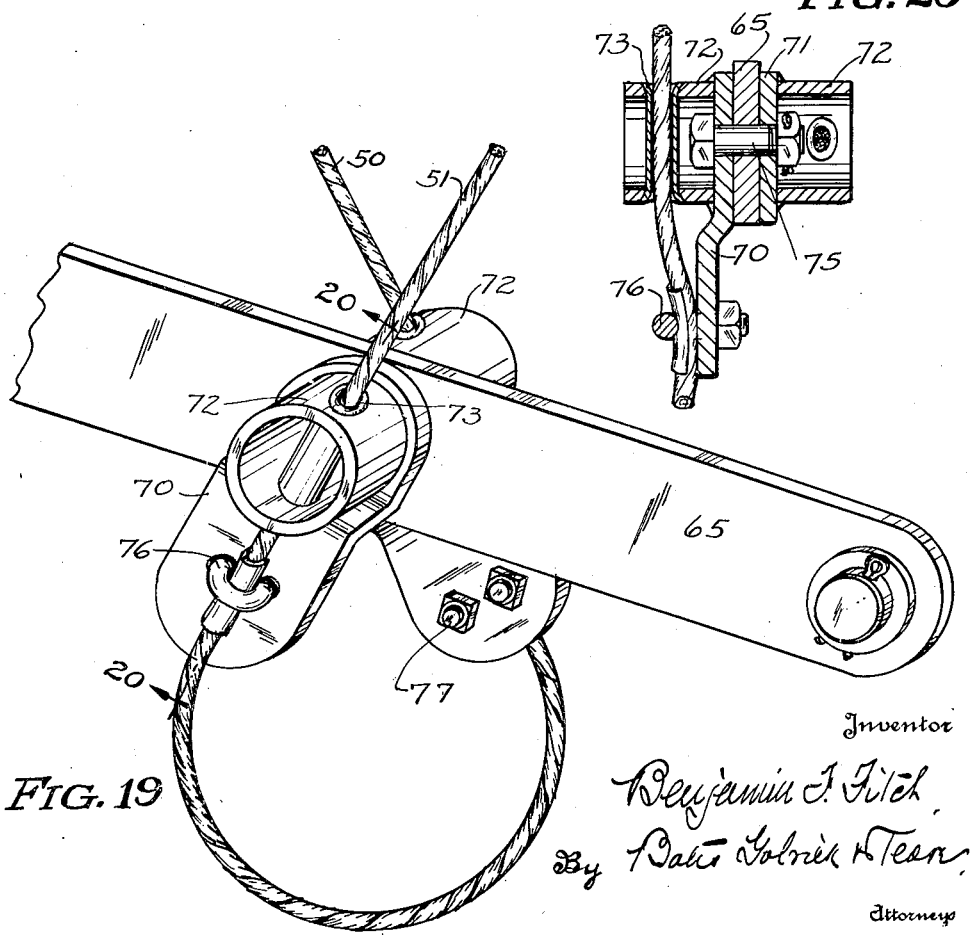

Patented May 8, 1934

1,957,451

UNITED STATES PATENT OFFICE 1,957,451

LIFTING CRADLE FOR DEMOUNTABLE AUTOMOBILE BODIES

Benjamin F. Fitch, Greenwich, Conn., assignor to Motor Terminals Company, Wilmington, Del., a corporation of Delaware Application November 13, 1931, Serial No. 574,743

24 Claims. (Cl. 294—67)

This invention relates to apparatus for connecting a lifting mechanism to a demountable automobile body, which may be loaded with package freight. My invention provides a load-engaging means arranged to be connected with the body at four points, two on each side, and adapted to be suspended in a horizontal position by suitable depending raising mechanism, whereby the body may be well supported for lifting while maintained in its level position.

More particularly the invention is designed to raise demountable bodies having supporting hooks adjacent their eaves and to that end provides a cradle or floating frame having shackles or loops pivotally mounted on the frame so that they may swing beneath the hooks. Means are provided for guiding the cradle as it is lowered so that the shackles will come into accurate position relative to the hooks. Means are also provided, operable from one end of the cradle frame, for moving the shackles as a unit so that they may be simultaneously swung from idle position to active position, or vice versa.

I prefer to provide the shackles with springs tending to hold them in their active positions, and rely on the guides carried by the frame to bring the frame, when lowered, into such relation to the hooks of the body that the shackles are cammed by the hooks away from their vertical depending position and then, when sufficiently lowered, will spring back into the mouth of the hooks, and remain in this position until swung to idle position by the operation of the manual device when it is desired to free the cradle.

One object of the invention is to provide for the ready swinging of the shackles from a position beyond the end of the demountable automobile body being handled. In this connection, I provide simple means for adjusting the mechanism which operate the shackles so that they may be swung substantially equal amounts by a single operation of the operating hand device. Another object is to provide a very simple form of guides for shifting the cradle either sidewise or lengthwise as may be necessary to center it with the hooks.

Another feature of the invention relates to the carrying of the cradle either by four vertically depending cables or by a single centrally positioned cable, and to this end I provide at four points on the cradle located adjacent the four shackles, suitable fittings having means for directly receiving the vertically depending cables or means for attaching the lower ends of hog rods, which incline inwardly and upwardly and are suitably connected to each other adjacent their upper ends so that a single crane hook may operate all of the hog rods to support the cradle and raise or lower it, as desired. The means by which I accomplish these results are also included within the invention.

Figure 14:
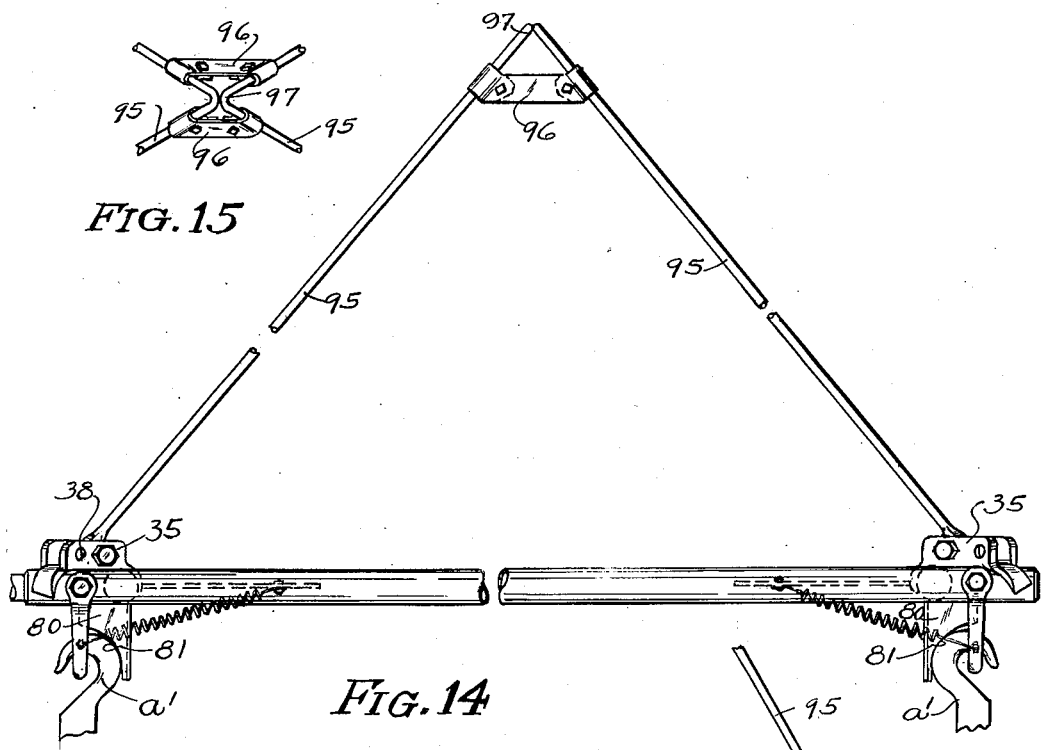
Figure 16:
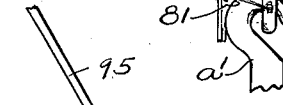
Figure 17:
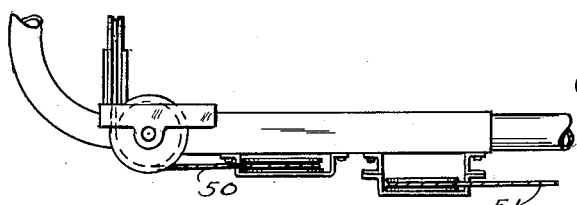
Figure 18:
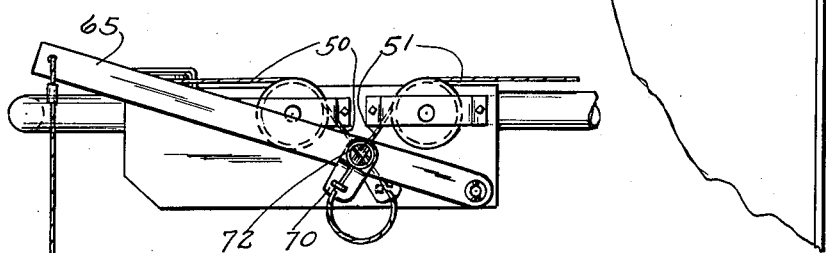

In the drawings, which illustrate embodiments of my invention, Fig. 1 is a side elevation of one form of my cradle, suspended from a traveling crane and in engagement with a demountable automobile body resting on a flat car, the cradle in this case being supported by four vertical cables; Fig. 2 is an elevation of the cradle in coaction with an automobile body on a flat car when the cradle is equipped with hog rods and is suspended from the hook of a suitable boom crane; Fig. 3 is a detail illustrating the action of the lateral guiding device in the positioning of the cradle, this view being in the nature of a cross section on the line 3—3 on Fig. 5; Fig. 4 is a plan of one form of my cradle; Fig. 5 is a side elevation of this form; Fig. 6 is a sectional elevation of the means for guiding the shackle-actuating cables adjacent the end of the frame, being a vertical section on the line 6—6 on Fig. 4; Figs. 7 and 8 are details in side elevation showing a shackle in relation to the corresponding body hook as the cradle is being lowered into position and after it has come into engaged position, respectively; Fig. 9 is an elevation of mechanism which may be employed for operating the shackle cables, this view being at right angles to Fig. 6 and looking from the direction indicated by the broken line 9—9 in that figure; Figs. 10 and 11 are elevations illustrating shackles at two diagonally opposite corners of the cradle, the position of the views being indicated by the correspondingly numbered lines on Fig. 4; Figs. 12 and 13 are perspectives, taken from different positions, of a corner of the cradle where the fittings for the cables and hog rods are welded to the top of the cradle frame; Fig. 14 is an elevation of the cradle having a somewhat different arrangement at the upper ends of the hog rods and having a different guide to cooperate with the hook in positioning the cradle; Fig. 15 is a fragmentary plan of the upper ends of the hog rods in Fig. 14, showing their method of connection; Fig. 16 is a detail adjacent one of the lower corners of this form of cradle illustrating the lateral guiding thereof; Fig. 17 is a plan of means on an extension of the cradle for guiding the shackle-operating cables; Fig. 18 is an elevation showing the cable guides in Fig. 17 and the means for operating these cables; Fig. 19 is a perspective of the means for attaching the shackle cable to the operating lever of Fig. 18; Fig. 20 is a section through the cable clamps of Fig. 19; Fig. 21 is a perspective of the combined lateral and longitudinal guide cooperating with the hook as shown in Figs. 14 and 16.

Referring first to Figs. 1 and 2, A indicates a demountable automobile body shown as resting on a flat car B, but adapted to be interchangeably mounted on a truck frame. The body A is provided with a floor frame, side walls, end walls and a roof, and suitable doors $a$ which may be located in the side walls and also preferably in the end walls. Each side of the demountable body is provided with two upwardly extending straps terminating at their upper ends in hooks $a'$ adapted to be engaged by raising mechanism. As shown, the hooks lie in a vertical plane practically coincident with the plane of the container side and extend a short distance above the shoulder where the roof joins the side wall of the container,—the hooks being thus at the eaves of the container.

My cradle provides a floating rigid frame and suitable shackles pivotally carried thereby and adapted to coact with the hooks of the body above referred to. The frame may readily be a pair of longitudinal tubular side bars 10 and a pair of end bars 11 and 12, joined to form an open rectangle, and preferably in the corners between the side and end bars I provide gusset plates 15. The side and end bars and the gusset plates may all be made integral by welding them together, as illustrated particularly in Fig. 12.

The cradle frame is supported by the raising mechanism either by four cables C depending from a traveling crane C' and engaging the cradle directly as shown in Fig. 1, or by a single raising cable D which, as shown in Fig. 2, may pass over a sheave on a crane boom D' and thence depend through a fall block $D^2$, the hook of which may coact with an arrangement of hog rods leading downwardly to the cradle, as illustrated in Figs. 2, 4, 5 and 14. In either case, the cradle is suspended in a horizontal plane and adapted to be raised or lowered and thus raise or lower a body suspended by it. The attachment of the individual cables C or the arrangement of the hog rods will be hereinafter more fully explained, after I have explained the operation of the cradle shackles, by which it may be engaged to demountable bodies.

Pivoted to each of the side bars 10, adjacent the end thereof, is a downwardly extending U-shaped loop or shackle 20 or 21. Each of these shackles is mounted on a transverse pin or bolt 22 extending through the frame member 10. The bolt may also pass through a fitting 30, hereinafter described, which embraces the bar 10 and has flattened sides lying on the inner face of the shackle as shown in Figs. 10 and 11, or it may pass through a squared boss 16 made integral with the side bar 10 by being welded thereto or forged therewith, as shown in Figs. 12 and 13.

Each shackle is preferably provided on one side with a loop or stirrup 23, preferably integral therewith, in which is swiveled a suitable clip 24. A spring 25 anchored to this clip and to a portion of the cradle frame (as by a bolt 26 passing through the gusset plate 15) tends to swing the shackle in one direction.

I prefer to so arrange the construction that the spring tends to bring the shackle into a vertical position, as shown in Fig. 8; and I arrange to swing the shackles manually, against the tension of the springs, to release them. This enables the shackles to engage automatically when the cradle is lowered, which I regard as the preferred operation. However, if it is desired, the springs might extend in the other direction and tend to swing the shackles to idle position, and the manual means be relied upon to swing them into active position until after the cradle has started to raise the load, whereupon the weight of the container will hold the shackles within the hooks.

To insure the shackles properly engaging the hooks when the cradle is lowered, I provide lateral and longitudinal guides. The lateral guides may consist of downwardly extending inclined straps 40, illustrated in Fig. 3 as secured to the underside of the gusset 15 and adapted to coact with the reinforcing strip $a^2$ running along the eave of the container A. To center the cradle longitudinally, I may provide downwardly extending straps 41 secured to the underside of the bars 10 and adapted to engage the back of the hook-crown as the cradle is lowered. These straps 41 may be welded or otherwise secured to the underside of the bars 10 adjacent the fittings 30 or the bosses 16, as illustrated in Fig. 12.

The cradle will have four of the lateral guides 40, one adjacent each corner, and four of the longitudinal guides, one adjacent each shackle, as illustrated in Fig. 7. When the cradle is lowered, the engagement of the guides 40 with this container body, as illustrated in Fig. 3, centers the cradle laterally, and then, as the cradle is nearly reaching its lowermost position, the longitudinal guides 41 engage the backs of the hooks $a'$, as shown in Fig. 7, and this introduces a camming action which pulls the cradle longitudinally in one direction or the other to properly center it with the hooks.

The lowering of the cradle, thus positioned by the lateral and longitudinal guides, causes the shackles to strike against the forward portion of the hook crowns and swing thereby so that they come opposite the mouths of the hooks, whereupon they spring into the hooks, as shown in Fig. 8. However, if desired, the shackles might all be retained by the manual operating device in the positions shown in Fig. 7 against the tension of their springs until the cradle has come to its lowermost position, after which the release of the shackles would allow the springs to swing them into active position.

To operate the shackles as a unit, the two shackles 21 near the far end of the frame are provided with upwardly extending arms 28 carrying swiveled clips 29. The operating cables, designated 50 and 51, are attached to the clips 24 of the first encountered shackles 20, and then combine to the clips 29 of the distant shackles.

The result of the described attachment of the cables 50 and 51 is that the pull toward the left (Fig. 4) on the cables will swing the two shackles 20 toward the left-hand end of the frame, and the two shackles 21 toward the right-hand end of the frame, thus spreading the shackles to clear the two outwardly facing hooks $a'$ and stretching the shackle springs 25. The mere release of the cables 50 and 51 results in the opposite movement of the shackles, under the influence of their springs.

To operate the two cables 50 and 51 as a unit from a point conveniently located beyond the end of the demountable body with which the cradle is coacting, I provide the cradle with a horizontal extension 60, which may comprise a tube or rod bent into the form of a bail, the ends of which extend into the bore of the side bars 10 and in which they are secured, as by vertical bolts 62. This bail carries, on its intermediate reach, sheaves 52 and 54 to direct the two cables toward each other, and then, at a suitable point, I provide on the cross bar 60 a pair of sheaves 55 and 56 between which the cables 50 and 51 may depend. I connect the two cables suitably to a lever 65 pivoted to a bracket 66 secured to the bail cross bar 60, as shown in Fig. 9, and I provide a depending operating cable 68 secured to the free end of the lever. When one pulls down on this cable 68, he causes the lever to draw down the two ends of the cables 50 and 51, and thereby swings the shackles against the action of their springs 25. On the other hand, the release of the hand cable 68 will allow the springs to return the shackles to normal position.

If the normal position of the shackles is vertical, as illustrated in Fig. 8, so that when the cradle is lowered, the shackles come automatically into the hooks by the action of their springs, then the manual mechanism just described is used to release the cradle from the positioned demountable body. For example, after the body has been raised from its support, transported and lowered onto a new support, as, for instance, from the truck to the flat car, the cradle is released, after the weight of the body is entirely supported independent of the cradle, by the operator pulling on the hand cable 68 to swing the shackles out of the hooks, as illustrated in Fig. 7.

It is desirable to have an adjustment for the attachment of the shackle-cables 50 and 51 to their operating device, so that all of the shackles may be swung the proper amount by the operation of the hand cable 68. Means for effecting this adjustment is illustrated in Figs. 18 to 20. In these views, the lever 65 is shown as having secured to its opposite sides a pair of fittings 70 and 71. Each fitting has an arm lying along the side of the bar 65, and a tubular extension 72 having an opening 73 for a cable guide. These two fittings may be secured by a single bolt 75, as in Fig. 20. Each reach of the cable is clamped to its respective fitting by a U-bolt 76 or 77, which holds it tightly in place, but the loosening of which enables the shifting of the cable one way or the other.

The two cables 50 and 51 may be a single member, the reach 50 passing downwardly through the guide of the fitting 71 and thence looping and passing upwardly through the guide to the fitting 72. The loop of the common cable between the fittings thus provides sufficient cable length for shifting either of them; thus either cable may be readily adjusted, as desired.

In place of using the independent guides 40 and 41 for positioning the cradle laterally and longitudinally, I may secure, to the underside of the longitudinal frame bars 10, four combined guides, as illustrated at 80 in Fig. 21. This combined guide is a fitting which may be welded to the under side of the bar and provides a recessed or curved surface 81 adapted to engage the back of the hook, and a laterally flaring side surface 82 adapted to engage the inner side of the hook. Accordingly, when the cradle so equipped is lowered, the surfaces 82 engage the inner sides of the hooks, as shown in Fig. 16, and position the cradle laterally; and then the surfaces 81 come down onto the backs of the hooks, as illustrated in Fig. 14, so that the cradle becomes positioned in all directions.

I desire to make my cradle so that four lifting cables may be attached directly to it adjacent the four shackles, or so that four hog rods may be attached adjacent the shackles and lead upwardly to a common region for engagement by a single hook. To this end, I form adjacent each of the corners of the cradle and rigidly secured to it, a member having two eyes, one for the direct vertical cable and the other for the diagonal hog rod. This member may comprise the tubular fitting 30, which is shown in Figs. 10 and 11, as embracing the tube 10, and as also receiving the bolt 22 carrying the shackle, and thus reinforcing the cradle frame in the shackle region. This member has an upwardly extending wing 31 equipped with two eyes. The outermost eye 32 furnishes means for the direct attachment of the vertical cable C, as shown in Fig. 1. The eye behind the eye 32 receives a bolt 34 passing through the eye and through the bifurcated lower end of a hog rod 90. The four hog rods are thus readily connected to the four corners of the cradle frame and lead upwardly to the common region.

Each hog rod 90 may terminate at its upper end in an eye 91 which loops through an eye in a common member 93 bowed upwardly to hang over the hook of a crane as shown in Fig. 2. If desired, two or more of the hog rods may have turnbuckles, indicated at 94, to adjust their length to insure the cradle being normally horizontal.

In place of the fittings 30 embracing the bars 10, I may provide fittings 35 of the type shown in Figs. 12 and 13, which are channel-shaped members resting on top of the frame and welded to it. In this case, the lower portion of the fitting preferably has tongues 36 projecting over the longitudinal and transverse bars of the frame and curving down onto them to obtain a more extended weld; and, if desired, bolts 37 may be added, passing through the fitting and the frame bars. This channel-shaped fitting 35 is provided with one set of eyes 38 to receive the direct vertical cables C of Fig. 1, and another set of eyes 39 to receive the hog rods 90. In this case, the hog rods indicated at 95 in Fig. 14 need not be bifurcated at their lower ends, but have plain eyes passing into the channels of the fittings 35 and held thereto by bolts occupying the eyes 39 of the fittings.

In Figs. 14 and 15, the hog rods, at their upper ends, are treated somewhat differently from the hog rods of Figs. 2, 4 and 5; that is to say, in Figs. 14 and 15 the two hog rods adjacent each end of the frame comprise one single bar bent intermediately into an inverted V-shape, and then these two bars may be locked together adjacent the bend by the two clips 96, each embracing one of the legs of the two doubled rods. This arrangement holds the two loops of the two hog rods together at 97, so that a single hook of a raising crane may loop through both of them.

It will be seen from the description given that I have provided a cradle which may be very rigid and strong, and, at the same time, very light. The cradle provides for the ready attachment of the four direct lifting cables or, by employing hog rods attached to the same fittings, the cradle is readily adapted for use with a single-hook crane. The mere lowering of the cradle brings it automatically into position laterally and longitudinally and may cause the shackles to automatically engage the hooks of the body, and thereafter, whenever it is desired to free the hooks, this is readily effected by operation of a single operating device located in an accessible position for the operator.

I claim:

1. A hoisting cradle, comprising a frame having means for engaging the load, and four fittings on the frame located at the four corners of a rectangle and each provided with two eyes for attachment of a vertical cable or a diagonal hog rod respectively.

2. A lifting cradle, comprising a frame provided with shackles for engaging a demountable body, said frame having fittings adjacent its corners, each provided with two eyes, and vertical lift cables attached to the outer eyes or diagonal hog rods attached to the inner eyes.

3. A lifting cradle, comprising an open rectangular frame made of four tubes fitted together, and gussets in the corners where the tubes join, said gussets being welded to both the longitudinal and transverse tubes.

4. In a lifting cradle, the combination of a rectangular frame having load engaging members, an extension for said frame in the form of a bail at one end, manual operating device for the load engaging members comprising cables connected with them and leading to the extension bail, and a depending device at the bail for operating the cables.

5. A hoisting cradle, comprising a rectangular frame having tubular side bars, an extension bail having arms extending into the side tubes, load engaging means carried by the side tubes, and operating means therefor carried by the bail.

6. In a hoisting cradle, the combination of an open rectangular frame, four pivoted shackles carried thereby, two on each side, cables connected to said shackles and leading about a pair of adjacent sheaves carried by the frame beyond one end thereof, and a lever connected to both cables after leaving said sheaves.

7. A hoisting cradle, comprising a frame, an extension on the end thereof, shackles carried by the frame, cables connected to the shackles and leading to a pair of adjacent sheaves on the extension, a lever carried by the extension and carrying a sheave below the space between the two sheaves first mentioned, the two cables joining and passing about the underside of the sheave on the lever.

8. A cradle, comprising a frame, shackles pivoted thereto, operating cables for moving the shackles, said cables being joined by a loop, means for operating the cables adjustably engaging both of them above the loop.

9. A hoisting cradle, comprising a frame, shackles carried thereby, a cable for operating the shackles, a lever for moving the cable, said lever having secured to it an arm with a boss, the cable passing through the boss and being guided thereby, and a U-shaped clamp embracing the cable and holding it to the arm.

10. A hoisting cradle, comprising a rectangular open frame, four load engaging shackles pivotally carried thereby, two by each side bar of the frame, and four lateral guides and four longitudinal guides carried by the cradle and adapted to position it with reference to a body having hooks which the shackles may engage.

11. A hoisting cradle, comprising a frame, a shackle pivotally carried thereby and adapted to engage a hook on a demountable body, and a guide carried by the frame and adapted to engage the back of the hook.

12. A hoisting cradle, comprising a frame, four pivoted load engaging members thereon adapted to engage a demountable body, and four guides carried by the frame, each having both longitudinal and lateral guiding surfaces to position the frame with reference to the body.

13. A hoisting cradle, comprising a rectangular frame equipped with means for engaging a load, four hog rods connected to the corners of the frame and leading diagonally upward, two hog rods at each end being a single bar inverted V-shaped, and means near the upper ends of the hog rods for engaging rods from both ends to hold the bends of the rods adjacent for engagement by a single hook of a hoist.

14. A hoisting cradle comprising a frame, a shackle pivoted thereto in the form of a downwardly extending loop, a stirrup formed on the side of the loop and a clip swivel to said stirrup for attachment of a device to swing the shackle.

15. A hoisting cradle, comprising a pair of tubular side bars, end bars connected to the side bars, means providing vertical flat surfaces on the opposite sides of the side bars, and U-shaped shackles embracing the side bars and bearing against said flat surfaces.

16. A hoisting cradle, comprising tubular side bars, fittings embracing the tubular side bars and having means for attachment of a supporting member, a transverse bolt passing through the fitting and bar, and a shackle pivotally supported by said bolt.

17. A hoisting cradle, comprising a frame, load engaging members thereon adapted to engage attaching devices on a demountable body, and guides carried by the frame, each adapted to engage one of the attaching devices on the body on a side surface and end surface of said attaching device.

18. A hoisting cradle, comprising a frame, means for supporting the same, four load supporting members on the frame adapted to engage respectively four hooks on a demountable body, and four downwardly extending guides carried by the frame, each adapted to engage the back of one of said hooks and a side surface thereof to position the frame with reference to the body.

19. A hoisting cradle, comprising a frame, a load engaging member thereon adapted to coact with a hook, and a downwardly extending guide carried by the frame, comprising a single member having a surface flaring in one direction and adapted to engage the back of the hook, said guide having a surface flaring in a direction transverse to the portion mentioned and adapted to engage the side of the hook.

20. A hoisting cradle, comprising a rectangular frame composed of tubular side bars and end bars, load engaging members carried by the frame, four fittings embracing the side bars and having eyes, and hog rods secured to said eyes.

21. A hoisting cradle, comprising an open rectangular frame having tubular side bars, fittings embracing the side bars adjacent the corners of the frame, eyes extending from said fitting and depending shackles pivoted to the fittings on horizontal axes.

22. A hoisting cradle, comprising an open rectangular frame having side bars and end bars, fittings connected to the side bars and end bars adjacent the corners of the frame, eyes extending upwardly from said fittings, and depending load engaging members connected to the fittings and having loops adapted to swing beneath hooks on a body to be lifted.

23. A hoisting cradle, comprising a frame of side bars and end bars, fittings at the four corners connected to the side bars and end bars, eyes on the fittings respectively, rods attached to the eyes and leading to a common region for engagement to a single lift hook, and four load attaching loops suspended from the fittings in a manner enabling them to swing in vertical planes.

24. A hoisting cradle, comprising an open rectangular frame having tubular side bars, fittings embracing the side bars adjacent the corners of the frame, eyes extending from said fittings, a sling including rigid members pivotally connected to said eyes, and U-shaped shackles having their arms extending onto opposite sides of the fittings and pivoted thereto.

BENJAMIN F. FITCH.